United States Patent [19]

Ogawa

[11] Patent Number: 4,677,309
[45] Date of Patent: Jun. 30, 1987

[54] SELF-COMMUTATED INVERTER IS SELECTIVELY DECOUPLED FROM AN AC GRID

[75] Inventor: Kiyoshi Ogawa, Tokyo, Japan

[73] Assignee: Kabushiki Kaisha Toshiba, Kawasaki, Japan

[21] Appl. No.: 911,458

[22] Filed: Sep. 25, 1986

[30] Foreign Application Priority Data

Sep. 30, 1985 [JP] Japan ................................ 60-216659

[51] Int. Cl.⁴ .............................................. H02J 3/40
[52] U.S. Cl. ........................................ 307/46; 307/66; 307/87
[58] Field of Search ....................... 307/44, 46, 66, 80, 307/87, 126; 363/57, 58

[56] References Cited

U.S. PATENT DOCUMENTS

3,932,764  1/1976  Corey ..................................... 307/87
4,473,756  9/1984  Brigden ................................ 307/66

Primary Examiner—William H. Beha, Jr.
Attorney, Agent, or Firm—Oblon, Fisher, Spivak, McClelland & Maier

[57] ABSTRACT

In a self-commutated power converter, an error signal input of an error amplifier in an active or reactive power control circuit is detected, and when the detected error signal input exceeds a predetermined value, a circuit breaker, which couples the power converter to an AC power system, is opened. Then, any malfunctioning of the power control system or power fault of the AC power system is detected in accordance with the value of the detection voltage of the AC power system.

15 Claims, 6 Drawing Figures

SELF-COMMUTATED INVERTER IS SELECTIVELY DECOUPLED FROM AN AC GRID

BACKGROUND OF THE INVENTION

The present invention generally relates to a system for coupling a DC power source to an AC power source, and specifically, to a self-commutated power converter which can continue to operate normally even when an AC power fault (power suspension) caused during an AC coupling of the system, occurs.

Conventionally, when AC power sources of different systems are to be operated in parallel, the voltage differences among these power sources are controlled according to the reactive power differences of the power sources, and the phase differences among them are controlled according to their active power differences. However, when a DC/AC power converter (known as an inverter) is coupled to a power system, the power system itself cannot be the subject of the control. For this reason, a self-commutated power converter (hereinafter simply referred to as a power converter) is generally adapted to control the active or reactive power.

Figure 1:
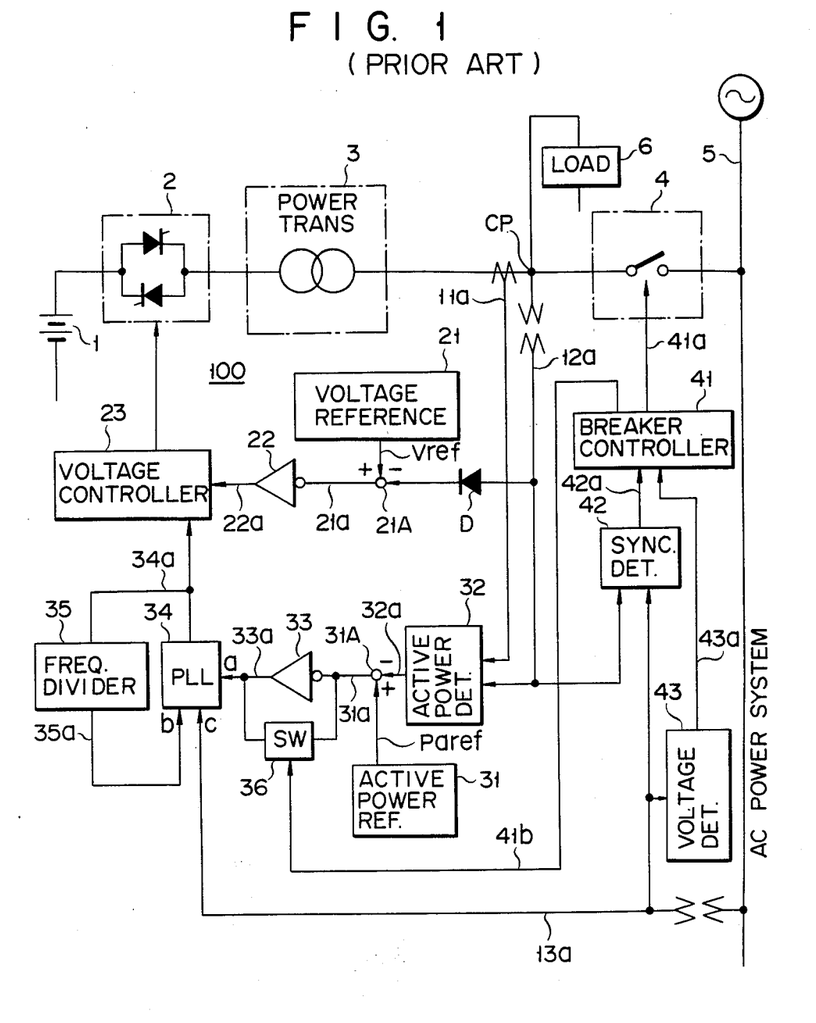
FIG. 1 is a block diagram showing a conventional control circuit of an AC coupling system.

FIG. 1 shows the above-described conventional power converter. In the figure, the DC output from DC power source 1 is converted to AC via power converter 2. The voltage of the converted AC power is changed to a prescribed value by power transformer 3. The AC power delivered from transformer 3 is coupled to AC power system 5 via circuit breaker 4.

In control circuit 100 of power converter 2, output Vref from voltage reference 21 is combined, at mixer 21A, with detection voltage 12a representing the voltage at coupling point CP. Error signal 21a, obtained by this mixing, is applied to error amplifier 22. Output 22a from amplifier 22 is one control input for voltage controller 23.

Similarly, output Paref from active power reference 31 is combined, at mixer 31A, with signal 32a output from active power detector 32. Error signal 31a, obtained by this mixing, is applied to error amplifier 33. Output signal 33a from amplifier 33 is supplied to phase set input "a" of phase-locked loop (PLL) 34.

The frequency of output signal 34a from PLL 34 is frequency-divided by frequency divider 35. Frequency-divided output 35a from divider 35 is then supplied, as phase feedback signal "b", to PLL 34. PLL 34 also receives, as phase reference signal "c", detection voltage 13a of power system 5. Output signal 34a from PLL 34 is supplied, as the other control input, to voltage controller 23.

Phase reference signal "c" of PLL 34 represents the voltage phase (13a) of power system 5. Accordingly, the output frequency of PLL 34 matches that of power system 5, and the voltage phase of power converter 2 is synchronized with that of power system 5.

Sync detector 42 includes a comparator circuit for comparing the phase of coupling point-detection voltage 12a with that of detection voltage 13a of power system 5. When the phase difference between voltages 12a and 13a falls within a predetermined range, detector 42 generates sync-detection signal 42a. Signal 42a is one of the closure-enabling conditions for circuit breaker 4 and is supplied to breaker controller 41.

Voltage detector 43 includes a comparator circuit for detecting, in accordance with a given reference threshold level, the value of voltage 13a of power system 5. Detector 43 supplies voltage detection signal 43a to breaker controller 41 when power system detection voltage 13a falls within the range defined by said given reference threshold level. Only when signals 42a and 43a are generated, does controller 41 output operation signal 41a for closing circuit breaker 4, and operation signal 41b for opening switch 36. Switch 36 is provided for short-circuiting the output of amplifier 33 with the input thereof when it is closed.

When circuit breaker 4 is opened and switch 36 is closed, coupling point-detection voltage 12a is automatically controlled to be equal to output Vref from voltage reference 21, so that a constant voltage corresponding to Vref is applied to load 6, provided that the power consumption of load 6 is smaller than the power capacity of converter 2. Besides, since switch 36 short-circuits the input and output of error amplifier 33, the error (33a) of active power control is substantially zero. Consequently, the active power control circuit, which controls the voltage phase of power converter 2 with respect to that of power system 5 according to the error (33a), is disenabled.

When circuit breaker 4 is closed and switch 36 is opened, the output of amplifier 33 is released from the short-circuiting with its input. Then, the voltage phase of converter 2 is automatically controlled, so that the active power of converter 2 matches output Paref from active power reference 31.

In the system of FIG. 1, when the total power of load 6 and a load (not shown) connected to power system 5 exceeds the output capacity of power converter 2, and if power system 5 is subjected to a power fault during the effective AC coupling of converter 2 with system 5, a protector (or safety device; not shown) of system 5 operates, so that controller 41 opens circuit breaker 4.

When the above total power of the loads is less than the output capacity of converter 2, even if a power fault occurs, converter 2 still supplies a certain amount of power to system 5. Then, voltage detector 43 cannot detect the power fault even if it actually occurs, and converter 2 continues its operation as if normal AC coupling with system 5 has been established.

In this case, however, converter 2 supplies power consumed only by load 6 and by the load connected to system 5. For this reason, the difference between active power reference output Paref and active power detection signal 32a becomes far greater than that obtained in a normal condition. This large difference (31a) causes output signal 33a of error amplifier 33 to be saturated, thereby disenabling the control for power converter 2. Then, because of the delay in the response of PLL 34 or the like, even if the power fault of system 5 is removed, converter 2 cannot operate in synchronism with system 5 immediately afterwards. Because of this, a large phase difference between the output voltage of converter 2 and the voltage of system 5 is temporarily generated.

Further, if an open-circuit fault occurs in active power detector 32, so that the closed feedback loop of the control circuit is cut off, output signal 33a of error amplifier 33 is saturated. Then, the active power system control is disenabled, and a large phase difference, exceeding a normal value, is generated between the output voltage of converter 2 and the voltage of system 5. That is, due to a power fault of power system 5 or a malfunction in the control of the active power control circuit, rapid exchanges of active power occur between converter 2 and system 5, and converter 2 can no longer continue its normal power-conversion operation. This is the disadvantage of the power converter of FIG. 1.

The above disadvantage can also be present in the case where control circuit 100 is provided with a reactive power control circuit, and the output of an error amplifier in the reactive power control circuit is saturated.

SUMMARY OF THE INVENTION

It is accordingly an object of the present invention to provide a self-commutated power converter in which rapid power exchanges between a power converter and a power system are prevented, even if the power system is subjected to a power fault or even if the control system of the power converter malfunctions.

To achieve the above object, in a self-commutated power converter of the invention, an error signal (31a), input to an error amplifier (33) in an active and/or reactive power control circuit of the self-commutated power converter, is detected, and when the detected error signal (31a) exceeds a predetermined value, a circuit breaker (4), which couples the power converter to an AC power system, is opened. Then, the malfunction of the power control system or the power fault of the AC power system is detected in accordance with the value of the detection voltage of the AC power system.

DETAILED DESCRIPTION OF THE PREFERRED EMBODIMENTS

Hereinafter, preferred embodiments of the invention will be described in detail with reference to the accompanying drawings. In the following descriptions, the same or similar elements are denoted by the same or similar reference numerals throughout the drawings, thereby avoiding redundant explanations.

Figure 2:
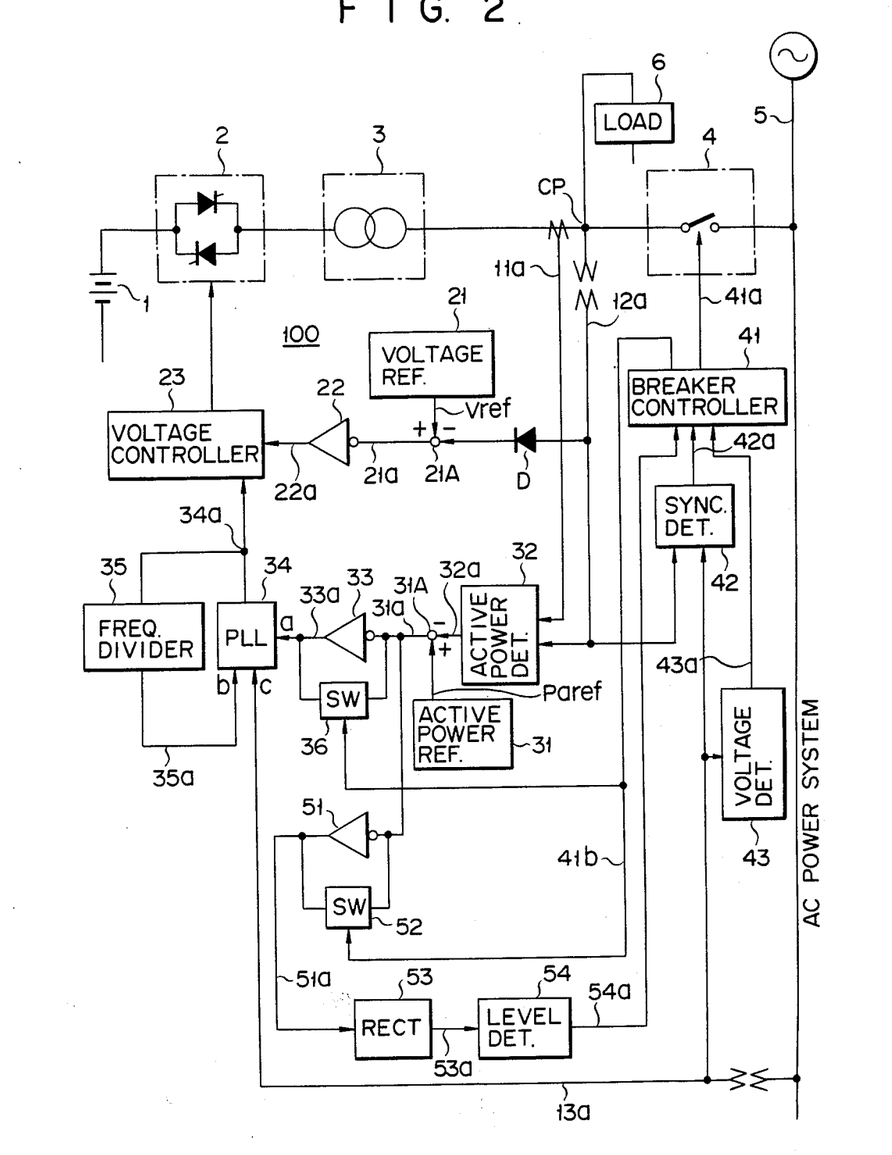
FIG. 2 is a block diagram showing a control circuit for an AC coupling system according to an embodiment of the present invention, in which an active power control circuit is provided.

FIG. 2 is a block diagram showing the control circuit of an AC coupling system according to an embodiment of the present invention, in which an active power control circuit is provided.

The circuit of FIG. 2 differs from the circuit in FIG. 1 in the following aspects. That is, breaker controller 41 is responsive not only to sync-detection signal 42a and voltage-detection signal 43a output from voltage detector 43, but also to output signal 54a. Signal 54a is obtained by amplifying the error signal 31a by means of amplifier 51, rectifying the signal 51a output from amplifier 51 by means of rectifier 53, and detecting the level of output 53a from rectifier 53 by means of signal level-detector 54.

Usually, error amplifier 33 is formed of a proportion and integration (PI) amplifier, and the integration time constant thereof is determined in consideration of the stability of the control system. Thus, the control system inevitably involves a long signal response delay time, due to the existence of a relatively large integration capacitor. To eliminate this long delay time, and to improve the response speed of error amplifier 33, a high-speed amplifier (51) is specially provided. A linear amplifier with a finite gain, or a PI amplifier with a small integration time constant and with a finite gain, can be used as amplifier 51.

In the circuit of FIG. 2, when circuit breaker 4 is opened, switch 36 as well as switch 52 are closed, so that the input and output of each of amplifiers 33 and 51 is short-circuited. In this case, the magnitude of signal 51a output from amplifier 51 becomes substantially zero, and level-detector 54 delivers output signal 54a with logic "0". This logic "0"0 signal 54a is supplied, as one of the closure-enabling conditions for circuit breaker 4, to breaker controller 41. Other closure-enabling conditions are sync-detection signal 42a with logic "1" and voltage-detection signal 43a with logic "1".

When the above three closure-enabling conditions are established, breaker controller 41 generates operation signal 41a, so that circuit breaker 4 is closed. At the same time, operation signal 41b is generated by controller 41, and switches 36 and 52 are opened to enable the active power control circuit which then operates, and signal 32a from active power detector 32 automatically matches output Paref from active power reference 31.

When the active power control circuit is operating normally, the level of error signal 31a applied to error amplifier 33 is quite small. In this case, the level of signal 51a output from amplifier 51 falls within a given set range of the detection level of signal level-detector 54. Then, output signal 54a with logic "0" is applied constantly, as one of the closure-enabling conditions, to breaker controller 41.

Incidentally, rectifier 53 is preferably formed of a full-wave rectifier, in order that both positive and negative polarities of the level of error signal 31a can be sensed by signal level-detector 54.

If the active power control circuit malfunctions due to short-circuiting accidently occurring in active power detector 32 or the like, the level of error signal 31a applied to error amplifier 33 becomes high and both output signals 33a and 51a respectively output from amplifiers 33 and 51 are saturated, so that the operation of the active power control circuit is disenabled. Similarly, if power system 5 is subjected to a power fault, power converter 2 feeds only that power determined necessary by load 6, and the level of error signal 31a between output Paref from active power reference 31 and signal 32a from active power detector 32 becomes high. Then, both signals 33a and 51a of amplifiers 33 and 51 are saturated, and control is disenabled.

Before output signal 33a from error amplifier 33 of the active power control circuit is saturated, signal level-detector 54 detects that signal 51a output from amplifier 51 exceeds a predetermined value, and detector 54 sends signal 54a to breaker controller 41, so that circuit breaker 4 opens. Since the opening of circuit breaker 4 disconnects power converter 2 from power system 5, whether or not power system detection voltage 13a has a material value can be detected independently of the output voltage of converter 2, by voltage detector 43.

When power system detection voltage 13a has a material value, circuit breaker controller 41 detects, via voltage detector 43, the malfunctioning of the active power control circuit, not a power fault of power system 5. Thus, detector 43 sends a closure-inhibition instruction; i.e., voltage detection signal 43a with logic "0", to controller 41, so that circuit breaker 4 remains in an open state. In this case, so long as power converter 2 is activated, load 6 can receive power, even if circuit breaker 4 is open.

When power system detection voltage 13a does not have a material value, or when no voltage 13a is detected, any power fault of power system 5, but not a malfunction of the active power control circuit, is detected by breaker controller 41. In this case, circuit breaker 4 remains in an open state, and power converter 2 is in a standby state for the AC coupling, in which converter 2 supplies power only to load 6.

After recovering the power of system 5 (similar to the initial stage of closing the circuit breaker 4), circuit breaker 4 is closed in accordance with the establishment of said three closure-enabling conditions. Then, power converter 2 can again perform its prescribed active power control function.

Figure 3:
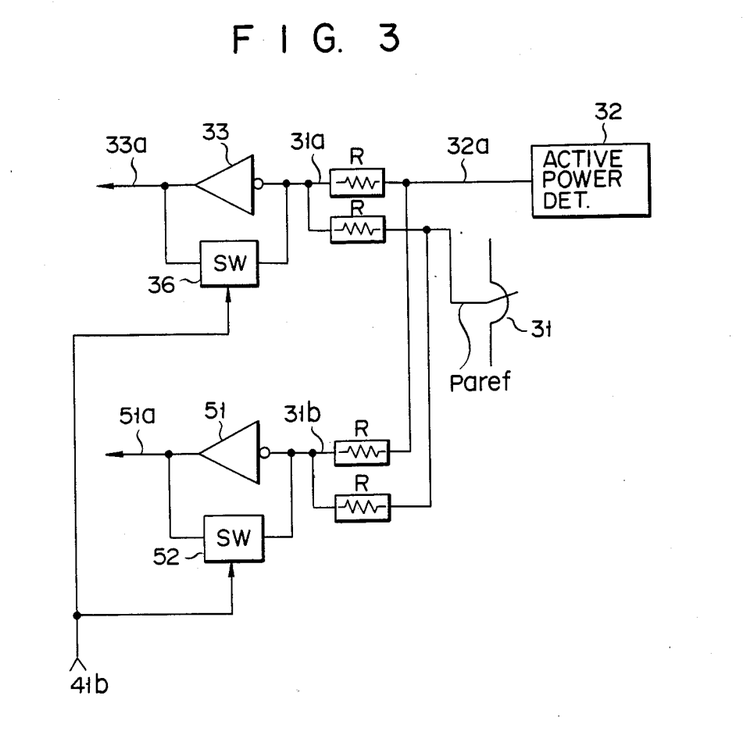
FIG. 3 shows a partial modification of a circuit involved in the control circuit of FIG. 2.

In the embodiment of FIG. 2, error signal 31a of error amplifier 33 in the active power control circuit is used as the input signal of amplifier 51. This error signal 31a appears at the summing point of operational amplifier 33 and, therefore, a long wiring assembly for feeding error signal 31a is not considered desirable in view of the resultant noise induction. However, if a relatively long wiring assembly is required, the wiring for signal 32a from active power detector 32 and that for output Paref from active power reference 31 are elongated, and outputs 32a and Paref are both summed at the respective input points of amplifiers 33 and 51 via resistors R, as shown in FIG. 3. Such a circuit arrangement can be made to be unaffected by external noises induced at the wiring assemblies for outputs 32a and Paref.

Figure 4:
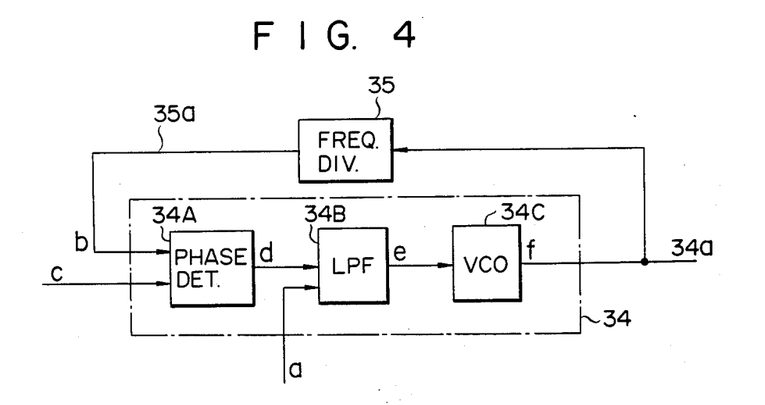
FIG. 4 shows a circuit configuration of a PLL (34) used in the embodiment of FIG. 2.

FIG. 4 shows details of PLL 34 used in the embodiment of FIG. 2. PLL 34 is formed of phase detector 34A for detecting phase difference "d" between PLL phase reference inputs "b" and "c", low-pass filter (LPF) 34B for filtering-off the higher-frequency component of phase difference "d", to provide filtered output "e", and voltage-controlled oscillator (VCO) 34C for generating output signal 34a with a frequency corresponding to the level of output "e". Signal 34a is frequency-divided via frequency divider 35 and changed to input "b".

When the frequency division rate of divider 35 is N, the oscillation frequency of VCO 34C is N times higher than that of PLL phase reference input "c". The quantity of N can be optionally determined in accordance with the number of phases of the inverter in power converter 2. When LPF 34B receives no input "a", PLL 34 operates such that the frequency and phase of input "b" automatically match those of input "c". If LPF 34B receives input "a" having a value within a certain range, PLL 34 operates such that the phase difference between inputs "b" and "c" automatically converges to a value corresponding to input "a".

Figure 5:
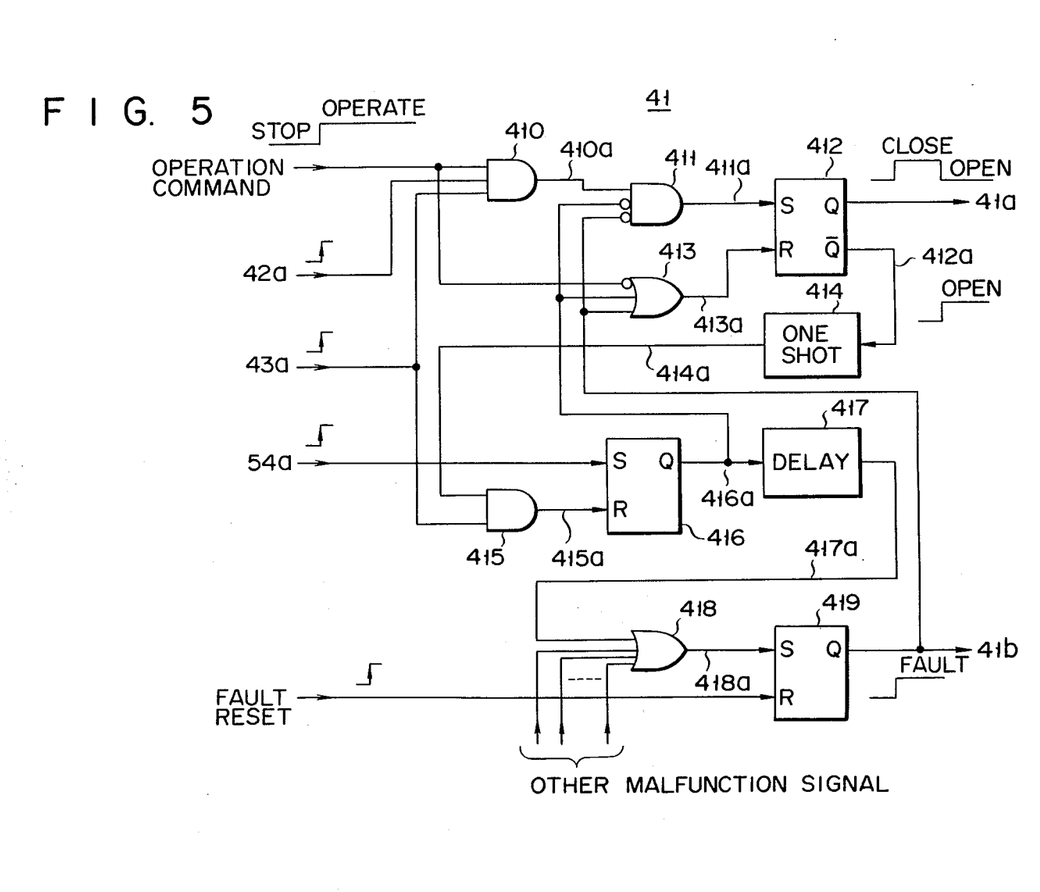
FIG. 5 shows a circuit configuration of a breaker controller (41) used in the embodiment of FIG. 2.

FIG. 5 shows a circuit configuration of breaker controller 41 as used in the embodiment of FIG. 2. When the power converter of FIG. 2 starts to operate, an operation command, whose logic level is changed from "0" to "1", is applied to the first input of AND gate 410. Gate 410 receives sync-detection signal 42a at its second input and voltage-detection signal 43a at its third input. Logical AND output 410a from gate 410 is applied to the first noninverting input of AND gate 411. Other inputs of AND gate 411 will be described later.

Logical AND output 411a from gate 411 is applied to the set input of RS flip-flop 412. RS flip-flop 412 is set by the logic level "1" of AND output 411a, and is reset by the logic level "1" of output 413a from OR gate 413. The inverting input of OR gate 413 receives said operation command. Other inputs of AND gate 411 will be described later.

The noninverting output (41a) from RS flip-flop 412 is used as operation signal 41a and is applied to circuit breaker 4. The logic level of signal 41a is "0" when circuit breaker 4 is opened, and is "1" when circuit breaker 4 is closed.

Inverting output 412a from RS flip-flop 412, whose logic level is changed from "0" to "1" when circuit breaker 4 starts to open, is supplied to one-shot (monostable multivibrator) 414. One-shot 414 is triggered by the logic level change "0" to "1" of output 412a, and it generates, at the time circuit breaker 4 opens, reset pulse 414a with a given pulse width.

Pulse 414a is applied to the first input of AND gate 415. AND gate 415 receives voltage detection signal 43a at its second input. Logical AND output 415a from gate 415 is applied to the reset input of RS flip-flop 416. RS flip-flop 416 is set by the logic level "1" of output signal 54a from signal level-detector 54, shown in FIG. 2. Noninverting output 416a from RS flip-flop 416 is applied to the second inverting input of AND gate 411 and also to the second noninverting input of OR gate 413.

Noninverting output 416a from RS flip-flop 416 is delayed by a given period via delay circuit 417. Delayed output (malfunction signal) 417a from circuit 417 is applied to the first input of OR gate 418. Other inputs of OR gate 418 respectively receive other malfunction signals from other power converters (not shown), if plural sets of power converters, each of which has the configuration of FIG. 2, are parallel-operated.

Logical OR output 418a from gate 418 is applied to the set input of RS flip-flop 419. The reset input of RS flip-flop 419 receives a fault reset signal. The logic level of the fault reset signal is changed from "0" to "1" when a fault in power system 5 or in control circuit 100 is eliminated. The noninverting output (41b) from RS flip-flop 419, serving as operation signal 41b, is applied to the third inverting input of AND gate 411 and also to the third noninverting input of OR gate 413.

RS flip-flop 419 is set by OR output 418a after RS flip-flop 416 is set by the logic level "1" of output signal 54a. Thus, signal 41b with logic level "1"indicates a fault or malfunction condition.

If the logic level of output signal 54a from detector 54 remains at the "0" level, RS flip-flops 416 and 419 are in the reset state, provided that the logic levels of other malfunction signals applied to OR gate 418 are all "0". (In this case, the logic level of operation signal 41b is "0".) This logic level "0" of output signal 54a is one of the three closure-enabling conditions for circuit breaker 4.

When the logic levels of signals 42a and 43a both change from "0" to "1", or the remaining two closure-enabling conditions are established under 54a="0", RS flip-flop 412 is set so that the logic level of operation signal 41a becomes "1". Then, circuit breaker 4 is closed.

The FIG. 2 embodiment performs a constant voltage control at coupling point CP. This embodiment is suitable when the power capacity of system 5 is substantially equal to or 2 to 3 times larger than the rated power of power converter 2. However, when a reactive power control or a constant power factor control is to be performed according to the present invention, a reactive power control circuit is additionally used.

Figure 6:
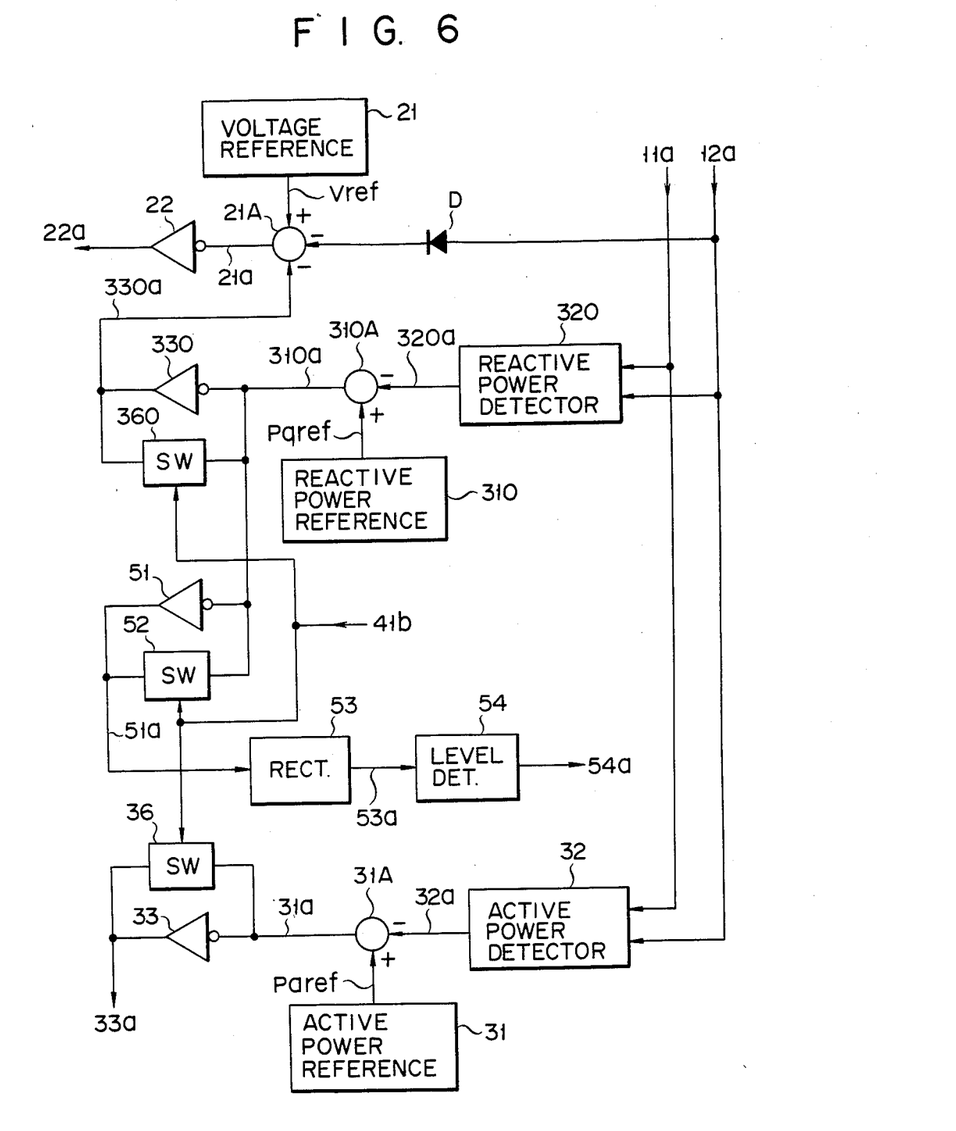
FIG. 6 is a partial block diagram showing the control circuit of an AC coupling system according to another embodiment of the present invention, in which a reactive power control circuit is provided in addition to the active power control circuit of the FIG. 2 embodiment.

FIG. 6 shows a part of control circuit 100 according to another embodiment of the present invention, in which a reactive power control circuit is provided in addition to the active power control circuit of FIG. 2.

In the embodiment of FIG. 6, detection current 11a, representing the output current of power converter 2, is supplied to reactive power detector 320. Detector 320 also receives detection voltage 12a of coupling point CP, shown in FIG. 2. Detector 320 is responsive to the sine component of voltage 12a and the cosine component of current 11a, and generates reactive power output 320a. Output 320a is applied to the negative input of mixer 310A. The positive input of mixer 310A receives output Pqref from reactive power reference 310. Error signal 310a from mixer 310A is amplified by inverting error amplifier 330. Output signal 330a from amplifier 330 is applied to the negative input of mixer 21A.

The output of amplifier 330 is coupled to its input via switch 360. Switch 360 is closed when operation signal 41b with logic level "1" is applied. When switch 360 is closed, the level of output signal 330a becomes substantially zero, so that the reactive power control is disenabled.

According to the above-mentioned embodiments, signal level-detector 54 detects error signal 31a (or 310a) with an abnormally large level, so that controller 41 opens circuit breaker 4. Then, if detection voltage 13a of power system 5 has a normal value, it can be judged that the fault has been caused by a malfunction of control circuit 100. In this case, re-close of circuit breaker 4 is inhibited.

However, when power system 5 is subjected to only a temporary power fault, even if control circuit 100 is functioning normally, the control circuit could be judged, wrongly, to be malfunctioning. Such a misjudgement can be avoided if circuit breaker 4 is re-closed and it is checked whether or not signal leve-detector 54 again detects an error signal (31a or 310a) of an abnormally high level.

If the speed of response for detecting a malfunction of control circuit proves to be relatively slow, amplifier 51 can be omitted. In this case, output signal 33a (FIG. 2) or output signal 330a (FIG. 6) is input to rectifier 53, and an error signal 31a (or 310a) of an abnormally high level is detected by error amplifier 33 (or 330).

Incidentally, the way in which power converter 2 operates after opening circuit breaker 4 is a matter of design.

As mentioned above, according to the embodiment of this invention, a malfunctioning of control circuit 100 can be distinguished from a power fault of power system 5. Consequently, an appropriate operation mode of power converter 2 can be selected after detecting the fault of the AC coupling system. In particular, the embodiment of this invention can protect power converter 2 of the AC coupling system from the effects of an accident caused by a large voltage phase difference between power system 5 and power converter 2.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims which scope is to be accorded the broadest interpretation, so as to encompass all such modifications and equivalent structures.

What is claimed is:

1. A self-commutated power converter coupled, via a circuit breaker, to an AC power system, comprising:
   means for detecting an output power of the self-commutated power converter, in order to generate a power-detection signal;
   means for generating an error signal representing the difference between said power-detection signal and a given power reference signal;
   output-control means for controlling the output of the self-commutated power converter according to said error signal;
   error magnitude-detection means for detecting the magnitude of said error signal, and generating a condition signal when the magnitude of said error signal reaches a predetermined value; and
   means for controlling the opening and closing of the circuit breaker, according to said condition signal.

2. A self-commutated power converter according to claim 1, wherein said output-control means includes:
   a first error amplifier for amplifying said error signal, and wherein said error magnitude-detection means includes:
   a second error amplifier for amplifying said error signal, to provide an amplified error signal; and
   a signal level-detector for detecting the level of said amplified error signal, and providing said condition signal when the level of said amplified error signal reaches a value corresponding to said predetermined value, said predetermined value representing the limit of nonsaturation of an output from said first error amplifier.

3. A self-commutated power converter coupled, via a circuit breaker, to an AC power system, comprising:
   means for detecting an output power of the self-commutated power converter, in order to generate a power-detection signal;
   means for generating an error signal representing the difference between said power-detection signal and a given power reference signal;
   output-control means for controlling the output of the self-commutated power converter according to said error signal;
   error magnitude-detection means for detecting the magnitude of said error signal, and generating a first condition signal when the magnitude of said error signal reaches a first predetermined value;
   means for detecting a voltage of the AC power system, and generating a second condition signal when the magnitude of said AC power system voltage reaches a second predetermined value; and
   means for controlling the opening and closing of the circuit breaker, according to said first and second condition signals.

4. A self-commutated power converter according to claim 3, wherein said output-control means includes:

a first error amplifier for amplifying said error signal, and wherein said error magnitude-detection means includes:
a second error amplifier for amplifying said error signal, to provide an amplified error signal; and
a signal level-detector for detecting the level of said amplified error signal, and providing said condition signal when the level of said amplified error signal reaches a value corresponding to said predetermined value, said predetermined value representing the limit of nonsaturation of an output from said first error amplifier.

5. A self-commutated power converter coupled, via a circuit breaker, to an AC power system, comprising:
means for detecting an output power of the self-commutated power converter, in order to generate a power-detection signal;
means for generating an error signal representing the difference between said power-detection signal and a given power reference signal;
output-control means for controlling the output of the self-commutated power converter according to said error signal;
error magnitude-detection means for detecting the magnitude of said error signal, and generating an error condition signal when the magnitude of said error signal reaches a first prefixed value;
means for detecting a phase difference between said AC power system voltage and a voltage appearing at a coupling point of the self-commutated power converter and the AC power system, and generating a phase condition signal when the magnitude of said phase difference reaches a second prefixed value; and
means for controlling the opening and closing of the circuit breaker, according to said error signal and said phase condition signal.

6. A self-commutated power converter according to claim 5, wherein said output-control means includes:
a first error amplifier for amplifying said error signal, and wherein said error magnitude-detection means includes:
a second error amplifier for amplifying said error signal, to provide an amplified error signal; and
a signal level-detector for detecting the level of said amplified error signal, and providing said error condition signal when the level of said amplified error signal reaches a value corresponding to said first prefixed value, said first prefixed value representing the limit of nonsaturation of an output from said first error amplifier.

7. A self-commutated power converter coupled, via a circuit breaker, to an AC power system, comprising:
power-detection means for detecting an output power of the self-commutated power converter, in order to generate a power-detection signal;
error signal-generating means for generating an error signal representing the difference between said power-detection signal and a given power reference signal;
output-control means for controlling the output of the self-commutated power converter according to said error signal;
error magnitude-detection means for detecting the magnitude of said error signal, and generating a first condition signal when the magnitude of said error signal reaches a first predetermined value;

voltage-detection means for detecting a voltage of the AC power system, and generating a second condition signal when the magnitude of said AC power system voltage reaches a second predetermined value;
phase difference-detection means for detecting a phase difference between said AC power system voltage and a voltage appearing at a coupling point of the self-excited power converter and the AC power system, and generating a third condition signal when said phase difference falls within a predetermined range; and
breaker-control means for controlling the opening and closing of the circuit breaker, according to said first, second, and third condition signals.

8. A self-commutated power converter according to claim 7, wherein said output-control means includes:
a first error amplifier for amplifying said error signal, and wherein said error magnitude-detection means includes:
a second error amplifier for amplifying said error signal, to provide an amplified error signal; and
a signal level-detector for detecting the level of said amplified error signal, and providing said first condition signal when the level of said amplified error signal reaches a value corresponding to said first predetermined value, said first predetermined value representing the limit of nonsaturation of an output from said first error amplifier.

9. A self-commutated power converter according to claim 8, wherein the operation speed of said second error amplifier is higher than that of said first error amplifier.

10. A self-commutated power converter according to claim 8, wherein said second error amplifier has a finite amplification factor.

11. A self-commutated power converter according to claim 8, wherein said output-control means includes:
means for short-circuiting the output of said first error amplifier with the input thereof when said first condition signal is provided to said breaker-control means.

12. A self-commutated power converter according to claim 8, wherein said error magnitude-detection means includes:
means for short-circuiting the output of said second error amplifier with the input thereof when said first condition signal is provided to said breaker-control means.

13. A self-commutated power converter according to claim 11, wherein said error magnitude-detection means includes:
means for short-circuiting the output of said second error amplifier with the input thereof when said first condition signal is provided to said breaker-control means.

14. A self-commutated power converter according to claim 7, wherein said power-detection means includes:
means for detecting an active output power of the self-commutated power converter, and generating an active power-detection signal used as said power-detection signal.

15. A self-commutated power converter according to claim 7, wherein said power-detection means includes:
means for detecting a reactive output power of the self-commutated power converter, and generating a reactive power-detection signal corresponding to said power-detection signal.

* * * * *